(12) United States Patent
Sehati

(10) Patent No.: US 12,555,490 B2
(45) Date of Patent: Feb. 17, 2026

(54) DRIVER-ASSISTANCE SYSTEM FOR EVALUATING A BEHAVIOR OF A DRIVER IN A TRAFFIC SITUATION BY A SMARTPHONE CONNECTED TO A VEHICLE CONTROL UNIT

(71) Applicant: FEV Group GmbH, Aachen (DE)

(72) Inventor: Amin Sehati, Auburn Hills, MI (US)

(73) Assignee: FEV Group GmbH, Aachen (DE)

( * ) Notice: Subject to any disclaimer, the term of this patent is extended or adjusted under 35 U.S.C. 154(b) by 187 days.

(21) Appl. No.: 18/368,729

(22) Filed: Sep. 15, 2023

(65) Prior Publication Data

US 2025/0095509 A1   Mar. 20, 2025

(51) Int. Cl.
| | |
|---|---|
| *G09B 19/16* | (2006.01) |
| *G06V 10/80* | (2022.01) |
| *G06V 20/58* | (2022.01) |
| *G06V 20/59* | (2022.01) |
| *G07C 5/02* | (2006.01) |

(52) U.S. Cl.
CPC ......... *G09B 19/167* (2013.01); *G06V 10/803* (2022.01); *G06V 20/58* (2022.01); *G06V 20/597* (2022.01); *G07C 5/02* (2013.01)

(58) Field of Classification Search
CPC .... G09B 19/167; G06V 10/803; G06V 20/58; G06V 20/597; G07C 5/02
See application file for complete search history.

(56) References Cited

U.S. PATENT DOCUMENTS

| 11,926,259 B1* | 3/2024 | Joo ...................... G08G 1/0967 |
| 2021/0097408 A1* | 4/2021 | Sicconi .................. B60W 50/14 |
| 2021/0108926 A1* | 4/2021 | Tran ........................ G06V 20/58 |
| 2022/0101662 A1* | 3/2022 | Griffin ................... G07C 5/008 |

* cited by examiner

*Primary Examiner* — Ig T An
(74) *Attorney, Agent, or Firm* — Dinsmore & Shohl LLP (57) ABSTRACT

The present disclosure relates to a driver-assistance system for assisting a driver of a vehicle, the driver-assistance system comprising a vehicle control unit, a mobile smartphone and a communication system, wherein the vehicle control unit is configured to provide a signal, wherein the signal describes at least partially a state of the vehicle and the smartphone is connectable to the vehicle control unit by the communication system for receiving the signal and comprises a first sensor, wherein the first sensor is configured to generate a first sensor value for detecting a traffic situation of the vehicle and the smartphone is configured to perform an evaluation of a behavior of the driver during the traffic situation dependent on the signal and the first sensor value and to output a result of the evaluation of the behavior of the driver.

10 Claims, 6 Drawing Sheets

DRIVER-ASSISTANCE SYSTEM FOR EVALUATING A BEHAVIOR OF A DRIVER IN A TRAFFIC SITUATION BY A SMARTPHONE CONNECTED TO A VEHICLE CONTROL UNIT

TECHNICAL FIELD

The present specification generally relates to the field of automated and semi-automated control of a vehicle and, in particular, to a driver-assistance system and a method for assisting a driver of a vehicle.

BACKGROUND

It is known to use a GPS sensor of a smartphone to track a position and/or a speed of the vehicle. In WO 2013/106818 A1 a monitoring system is described which is configured to determine a pattern of usage of a vehicle by tracking movements of a handheld mobile communication device.

SUMMARY

Various embodiments provide a driver-assistance system for assisting a driver of a vehicle and a method for assisting a driver of a vehicle described by the subject matter of the independent claims. Advantageous embodiments are described in the dependent claims. Embodiments of the present disclosure can be freely combined with each other if they are not mutually exclusive.

In one aspect, the present disclosure relates to a driver-assistance system for assisting a driver of a vehicle. The driver-assistance system, in the following also referred to as system, includes a vehicle control unit (e.g., an electronic control unit), a mobile smartphone and a communication system. The vehicle control unit is configured to provide a signal. The signal describes at least partially a state of the vehicle. The smartphone is connectable to the vehicle control unit via the communication system for receiving the signal. Furthermore, the smartphone includes a first sensor. The first sensor is configured to generate a first sensor value for detecting a traffic situation of the vehicle. The smartphone is configured to perform an evaluation of a behavior of the driver during the traffic situation dependent on the signal and the first sensor value and to output a result of the evaluation of the behavior of the driver such that the result of the evaluation is perceivable for the driver. Further, a recommendation may be generated on how to drive the vehicle dependent on the result of the evaluation of the behavior in which the driver then controls the vehicle differently based on the evaluation and/or on the recommendation generated and displayed to the driver for similar traffic situation for the vehicle and the driver.

The advantage of the smartphone being configured to perform the evaluation of the behavior of the driver during the traffic situation, in the following also referred to as evaluation of the behavior, dependent on the signal and the first sensor value is that a computational load for performing the evaluation of the behavior may be shifted from the vehicle control unit (VCU) to the smartphone. In addition to that, the signal and the first sensor value do not need to be sent to an external server in order to process the first sensor value and the signal for performing the evaluation of the behavior. This may allow to keep the first sensor value private. Moreover, this may reduce a necessary bandwidth for a communication between the smartphone and the external server, in case such a communication is required.

Furthermore, the proposed system described herein may allow to upgrade the vehicle in case the vehicle does not include a camera or a lidar sensor. It is understood that, in this case, the first sensor may be in the form of a camera or a lidar. Generally, the proposed system described herein may allow to enhance the vehicle such that an additional sensor, namely the first sensor of the smartphone, may be used for assisting the driver of the vehicle. On top of that, as at least one processor of the smartphone may be configured for performing the evaluation of the behavior, a computational resource may be added to the VCU for processing data, such as the signal and the first sensor value, in order to provide functions which may be solely provided by a further advanced system (ADAS) implemented in the vehicle in case the proposed system was not used. It is understood that the smartphone includes at least one processor. This additional processor may allow to perform the evaluation of the behavior in real-time.

According to one embodiment, the system may include a server and the smartphone may be designed to establish a connection to the server and to send the result of the evaluation of the behavior to the server. In this embodiment, the server may be configured to generate a recommendation on how to drive the vehicle dependent on the result of the evaluation of the behavior and a database. The database may include further results of evaluations of a behavior of the driver and/or further drivers during further traffic situations. By using the database in order to generate the recommendation, the result of the evaluation of the behavior may be related to the further results. The recommendation on how to drive the vehicle may include a comparison between the result of the evaluation of the behavior and the further results. As such, recommendation instructs the driver who then actually controls the vehicle differently based on the recommendation generated and displayed to the driver for similar traffic situation for the vehicle and the driver.

In another aspect, the present disclosure relates to a method for assisting a driver of a vehicle by a driver-assistance system including a vehicle control unit (e.g., an electronic control unit), a mobile smartphone and a communication system. The method may include the following steps. In a first step, a signal may be provided by the vehicle control unit, wherein the signal describes at least partially a state of the vehicle. In a second step, the smartphone may be connected to the vehicle control unit by the communication system for receiving the signal. In a third step, a first sensor value for detecting a traffic situation of the vehicle may be generated by a first sensor of the smartphone. In a fourth step, an evaluation of a behavior of the driver during the traffic situation may be performed dependent on the signal and the first sensor value by the smartphone. In a fifth step, a result of the evaluation of the behavior of the driver during the traffic situation may be outputted by the smartphone such that the result of the evaluation is perceivable for the driver.

In another aspect, the present disclosure relates to a computer program product comprising instructions, wherein an executing of the instructions by one or more processors initiates the one or more processors to execute the aforementioned method. The dependent claims describe advantageous forms of the proposed system and the proposed method.

BRIEF DESCRIPTION OF THE SEVERAL VIEWS OF THE DRAWINGS

In the following, embodiments of the present disclosure are explained in greater detail, by way of example only, making reference to the drawings in which.

DETAILED DESCRIPTION

Figure 1:
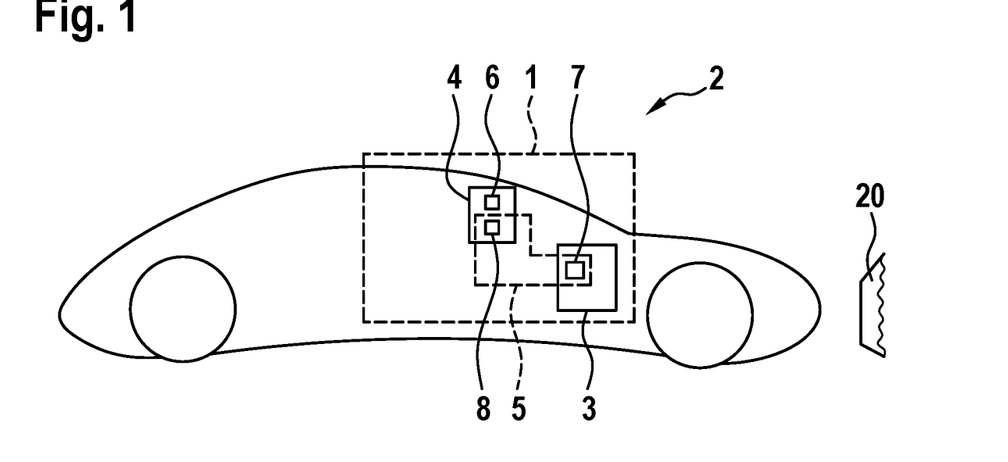
FIG. 1 schematically depicts a vehicle comprising a driver-assistance system with a vehicle control unit and a smartphone according to one or more embodiments shown and described herein.

FIG. 1 depicts a driver-assistance system 1 for assisting a driver of a vehicle 2. The system 1 includes a vehicle control unit 3 (VCU), a mobile smartphone 4 and a communication system 5. The VCU 3 may be an electronic control unit, a central processing unit (CPU), and the like, for performing the functions as described herein. The VCU 3 may be configured to provide a signal 200, which describes at least partially a state of the vehicle 2. As such, the VCU 3 may be configured to receive, analyze and process sensor data, perform calculations and mathematical functions, convert data, generate data, control vehicle system components (e.g., apply a brake signal, a speed control signal or a steering signal that actual or physically controls the vehicle 2), and the like. The VCU 3 may include one or more processors, and other components, for example one or more memory modules that stores logic that is executable by the one or more processors. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, and the like, that may be compiled or assembled into computer-executable instructions and storage on the one or more memory modules. Alternatively, the computer-executable instructions may be written in hardware description language, such as logic implemented via either a field programmable gate array (FPGA) configuration or an application specific integrated circuit (ASIC), all their equivalents. Accordingly, the systems, methods and/or processes described herein may be implemented in any conventional computer programming language, as preprogrammed hardware elements, or as a combination of hardware and software components.

The smartphone 4 is connectable to the VCU 3 via the communication system 5 for receiving the signal 200. The smartphone 4 may include a first sensor 6. The first sensor 6 is configured to generate a first sensor value 100 for detecting a traffic situation of the vehicle 2. The smartphone 4 may be configured to perform an evaluation of a behavior of the driver dependent on the signal 200 and the first sensor value 100 and to output a result 300 of the evaluation of the behavior such that the result 300 is perceivable for the driver. The behavior of the driver refers to a behavior of the driver during the traffic situation of the vehicle 2, in the following also referred to as traffic situation.

Figure 2:
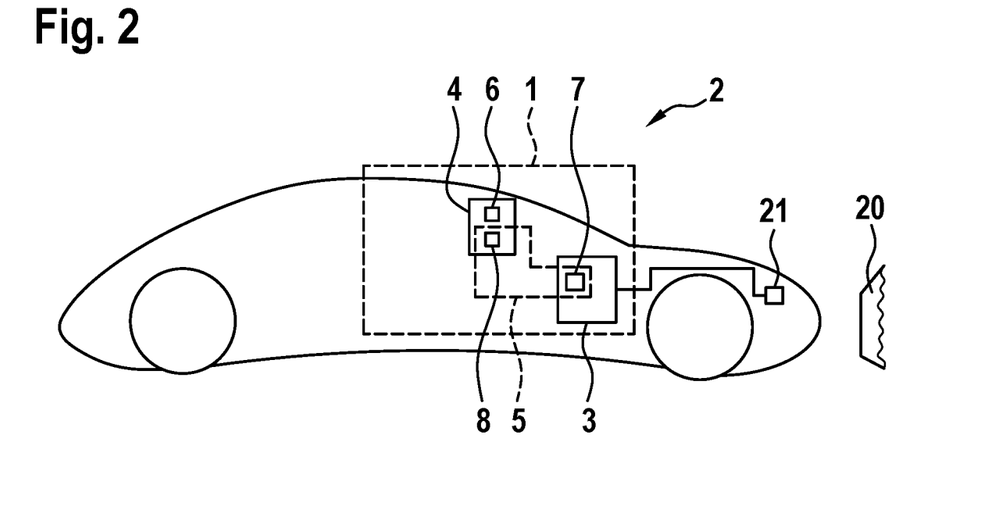
FIG. 2 schematically depicts the system shown in FIG. 1 further including a sensor according to one or more embodiments shown and described herein.

The signal 200 may be designed in the form of a further sensor value or may be calculated dependent on the further sensor value, wherein the further sensor value may be generated by a further sensor 21 of the system 1. The further sensor 21, shown in FIG. 2, may be a component of a further driver-assistance system of the vehicle 2, which is not shown in FIG. 2. The further driver-assistance system may be an advanced driver-assistance system (ADAS), such as an adaptive cruise control system or a collision avoidance system in one example. In this case, the further sensor 21 may be a lidar sensor or a radar sensor. The further sensor value may be a part of data for describing an environment of the vehicle, which is referred to as external data in the following. Hence, the state of the vehicle 2, which is at least partially described by the signal 200, may be described by the external data. In one example, the external data may specify a distance between the vehicle and a further vehicle 20 and/or a velocity of the further vehicle 20.

Alternatively, or in addition to the data related to at least a partial state of the vehicle 2, the signal 200 may be a signal for controlling the vehicle 2, such as a brake signal, a speed control signal or a steering signal, or for monitoring the vehicle 2 that actually controls or changes the operating state of the vehicle 2. In the latter case, the signal 200 may include a value indicating a fuel consumption or an acceleration of the vehicle 2, as a non-limiting example. In case the signal 200 is a signal for monitoring or for controlling the vehicle 2, the signal 200 may be a part of data for describing an operational state of the vehicle 2, which is referred to as internal data as described in greater detail herein. Hence, the state of the vehicle 2, which is at least partially described by the signal 200, may be described by the external data and/or internal data.

Figure 3:
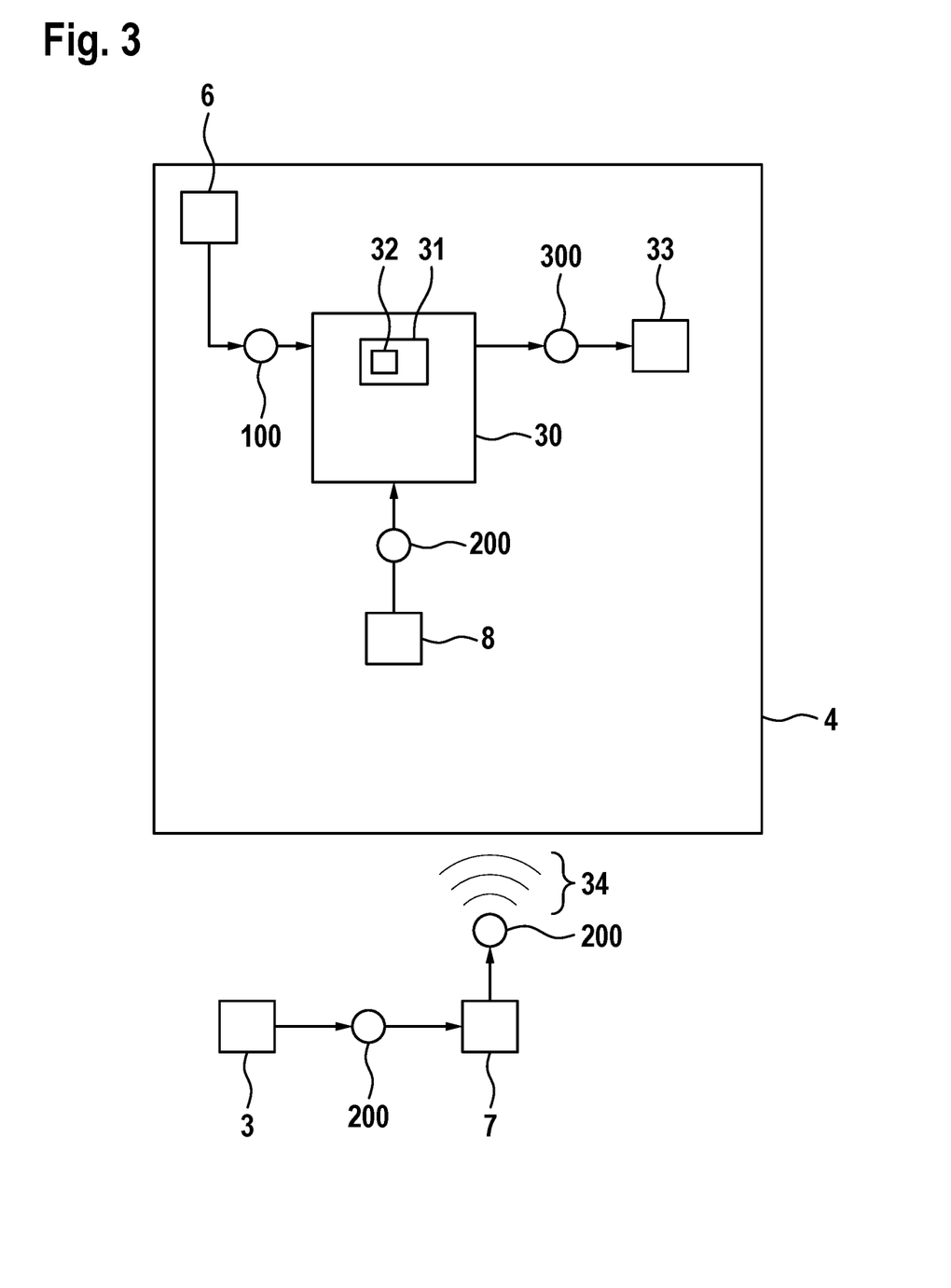
FIG. 3 represents a block diagram describing how the smartphone may perform an evaluation of a behavior of a driver of the vehicle shown in FIG. 1 according to one or more embodiments shown and described herein.

FIG. 3 schematically depicts a block diagram illustrating how the smartphone 4 may generate the result 300. The signal 200 provided by the VCU 3 may be transmitted by a sending unit 7, particularly via sending electromagnetic waves 34. The signal 200 may be received by a receiving unit 8 of the smartphone 4. In one example, the receiving unit 8 and the first sensor 6 may be each connected to the processor 30 via electrical links. The processor 30 may include or be communicatively coupled to a memory element 31, which may store an evaluation module 32. The processor 30 may be configured to compute the result 300 dependent on the first sensor value 100 and the signal 200, and in particular by the evaluation module 32. The processor 30 may send the result 300 to output device 33 of the smartphone 4. The output device 33 may include a display for visualizing the result 300. Alternatively or in addition, the output device 33 may include a loudspeaker for outputting the result 300 acoustically.

The term "module" as used herein describes any possible type of hardware, software, or combination of hardware and software known or developed in the future, such as an executable program, artificial intelligence, fuzzy logic, that is designed, in particular configured to, perform any of the functions associated with the "module".

The processor 30 may be one or more processors, and may be part of a central processing unit (CPU), electronic control unit (ECU) and the like. The memory element 31 may be at least one module that stores logic that is executable by the one or more processors (e.g., the evaluation module 32). As such, the processor 30 may be a controller, an integrated circuit, a microchip, central processing unit or any other computing device. The one or more memory element 31 may be non-transitory computer readable medium and may be configured a RAM, ROM, flash memories, hard drives, and, or any device capable of storing computer-executable instructions, such that the computer-executable instructions can be accessed by the processor 30. The computer-executable instructions may include logic or algorithms, written in any programming language of any generation such as, for example machine language that may be directly executed by the processors, or assembly language, object orientated programming, scripting languages, microcode, and the like, that may be compiled or assembled into computer-executable instructions and storage on the one or more memory modules. Alternatively, or additionally, the computer-executable instructions may be written in hardware description language, such as logic implemented via either a field programmable gate array (FPGA) configuration or an application specific integrated circuit (ASIC), all their equivalents. Accordingly, the systems, methods and/or processes described herein may be implemented in any conventional computer programming language, as preprogrammed hardware elements, or as a combination of hardware and software components.

The sending unit 7 and the receiving unit 8 may be part of the communication system 5. In case the sending unit 7 transmits the signal 200 via the electromagnetic waves 34, a communication between the sending unit 7 and the receiving unit 8 may be performed using a Wi-Fi or a Bluetooth protocol. According to another embodiment, not shown in the figures, the communication between the sending unit 7 and the receiving unit 8 may be realized via one or more electrical wires. In this case, the sending unit 7 may be an on-board diagnosis (OBD) port of the VCU 3. FIG. 3 shows an embodiment, according to which the sending unit 7 is arranged separately from the VCU 3. However, the sending unit 7 may be integrated in the VCU 3, as shown in FIG. 1. This may be the case if the sending unit 7 is designed in the form of the OBD port. In one example, the sending unit 7 may be electrically connected to the OBD port for transmitting the signal 200, which may be generated by the OBD port, via the electromagnetic waves 34. The sending unit 7 may be designed in the form of a mountable adapter for updating the VCU 3 such that OBD signals, including the signal 200, may be transmitted via the electromagnetic waves 34.

Figure 4:
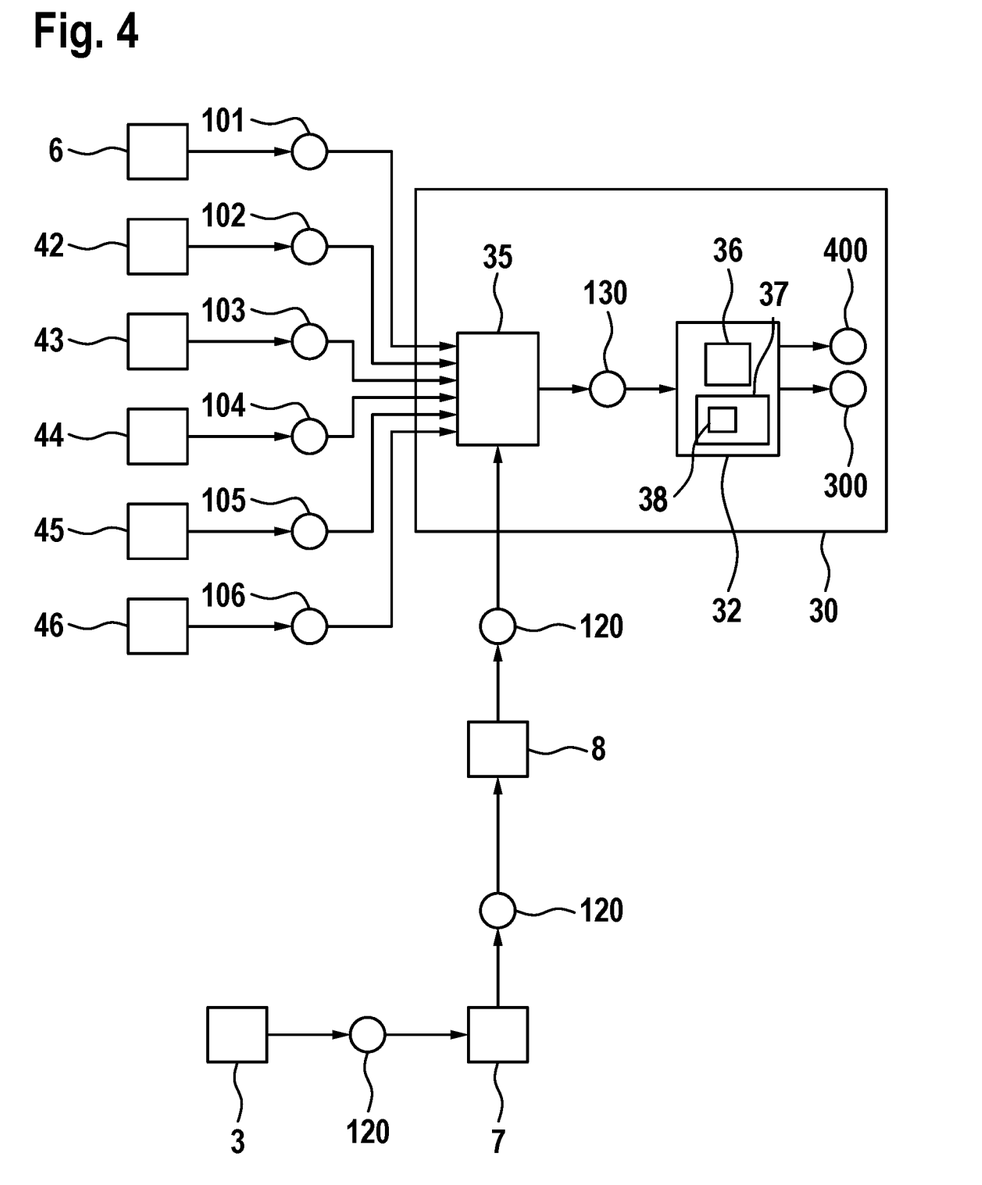
FIG. 4 schematically depicts an embodiment of the smartphone shown in FIG. 1 further including several sensors according to one or more embodiments shown and described herein.

FIG. 4 depicts an embodiment according to which the smartphone 4 includes multiple sensors. The multiple sensors may involve the first sensor 6, a second sensor 42, a third sensor 43, a fourth sensor 44, a fifth sensor 45 and a sixth sensor 46. According to one example, the first sensor 6 may be a main camera of the smartphone 4, the second sensor 42 may be a further camera of the smartphone 4, the third sensor 43 may be a zoom camera of the smartphone 4, the fourth sensor 44 may be a lidar sensor, the fifth sensor 45 may be GPS sensor, and the sixth sensor 46 may be an acceleration sensor. In one example, the further camera may include a wide-angle lens.

The first sensor 6 may repeatedly send a first data set 101, including the first sensor value 100, with a first clock rate to the processor 30. The first data set 101, which may involve a first image file, may be updated each time it is sent repeatedly to the processor 30. In one example, the first data set 101 may include only the first sensor value 100.

Analogously, the second sensor 42, the third sensor 43, the fourth sensor 44, the fifth sensor 45 and/or the sixth sensor 46 may repeatedly send a second data set 102 with a second clock rate, a third data set 103 with a third clock rate, a fourth data set 104 with a fourth clock rate, a fifth data set 105 with a fifth clock rate and a sixth data set 106 with a sixth clock rate respectively to the processor 30. The second data set 102, the third data set 103, the fourth data set 104, the fifth data set 105 and the sixth data set 106 may be respectively updated each time the second data set 102, the third data set 103, the fourth data set 104, the fifth data set 105 and the sixth data set 106 is respectively sent repeatedly to the processor 30.

The second data set 102 may include a second image file, the third data set 103 a third image file, the fourth data set 104 a lidar data file and the fifth data set 105 a GPS data file. The sixth data set 106 may include a value of a longitudinal and a lateral acceleration of the smartphone 4.

The processor 30 may be configured to store the updated versions of the first data set 101, the second data set 102, the third data set 103, the fourth data set 104, the fifth data set 105 and the sixth data set 106 respectively in order to construct a first time series, a second time series, a third time series, a fourth time series a fifth time series and a sixth time series respectively. Hence, the first, second, third, fourth, fifth and sixth time series may respectively include a respective set of several updated versions of the first data set 101, the second data set 102, the third data set 103, the fourth data set 104, the fifth data set 105 and the sixth data set 106, respectively.

The sending unit 7 may be configured to send out repeatedly data generated by the VCU 3, in the following also referred to as VCU data 120, with a first further clock rate. The VCU data 120 may include the signal 200. Generally, the VCU data 120 may involve signals for controlling the vehicle 2, in particular signals provoked by the driver, such as the brake signal, the steering signal and the speed control signal. Alternatively or in addition, the VCU data 120 may include signals for monitoring the vehicle 2, for example the value indicating the fuel consumption and the current speed and acceleration of vehicle 2. In one example, the VCU data 120 may involve input and/or output signals of the further driver-assistance system, such as steering interventions, distances and velocities of further vehicles and traffic signs in the environment of the vehicle 2.

The VCU data 120 may be updated by the VCU 3 each time the VCU data 120 is sent repeatedly out by the sending unit 7. In one example, the VCU data 120 sent out by the sending unit 7 may only include the signal 200. The processor 30 and/or components thereof, may be configured to store the updated versions of the VCU data 120 and to generate a VCU data time series including a set of the updated versions of the VCU data 120.

The processor 30 may be configured to fuse at least one of the data sets 101, 102, 103, 104, 105 and 106 with the VCU data 120. In particular, the processor 30 may be programmed for fusing at least one of the first, second, third, fourth, fifth and sixth time series with the VCU data time series. As the first, second, third, fourth, fifth, sixth and the first further clock rate do not necessarily have to coincide, data values of the first, second, third, fourth, fifth and sixth time series and of the VCU data time series may be each associated to different points of time.

A fusion module 35, which may be stored in the memory element 31, may be configured to generate a time series of an assembled data object 130, in the following also referred to as assembled time series. Data entries of the assembled data object 130 may include a selection of the data values of the first, second, third, fourth, fifth and/or sixth time series and of the VCU data time series and/or a set of generated values based on the data values of the first, second, third, fourth, fifth and/or sixth time series and of the VCU data time series by the fusion module 35. The assembled data object 130 may be updated with a second further clock rate. The assembled time series may include a set of several updated versions of the assembled data object 130.

The processor 30 may be configured to compute the assembled time series the fusion module 35 such that data entries of the respective updated assembled data object 130 may be associated to a respective point in time or a respective time interval that lies within a time period within which the traffic situation takes place. This may have the advantage that the respective updated assembled data object 130 may serve as a respective data set for the evaluation module 32, wherein each updated assembled data object 130 refers to only one respective point of time or one respective time interval. A number of these points in time or of these time intervals may be equal to a product of a total duration of the time period and the second further clock rate. In order to generate the respective updated version of the assembled data object 130, the fusion module 35 may perform data interpolations of the data values of the first, second, third, fourth, fifth and/or sixth time series and/or of the data values of the VCU data time series.

The processor 30 may be configured to process output data of the fusion module 35, in particular the assembled data object 130 or the assembled time series, in the form of input data of the evaluation module 32. The evaluation module 32 may be designed to detect the traffic situation dependent on the assembled time series.

In one example, the evaluation module 32 may detect the traffic situation dependent on a first part and/or a second part of the data values of the assembled time series. The first part may include data values which are generated on the basis of the first, second, third, fourth, fifth and/or sixth time series by the fusion module 35. The second part may include the data values, which are generated on the basis of the VCU data time series by the fusion module 35.

In one example, the evaluation module 32 may involve or further include a detection module 37 for detecting the traffic situation explicitly. The detection module 37 may be configured to select one class of a set of classes dependent on the first part and/or the second part of the data values of the assembled time series. Each class of the set of classes may represent a respective traffic situation, such as a lane change, an approaching to the further vehicle 20, which may drive in the front of the vehicle 2, or an overtaking maneuver for example. Selecting the class dependent on the input data of the evaluation module 32 may be considered as detecting the traffic situation of the vehicle 2 explicitly according to this example. The detection module 37 may further include or be communicatively coupled to a first machine learning module (ML-module) 38 for detecting the traffic situation, and in some embodiments, may be explicitly dependent on the first part and/or the second part of the data values. In other embodiments, the detection module may not be explicitly dependent on the first part and/or the second part of the data values.

The processor 30 may be configured to compute the result 300, such as by utilizing a second ML-module 36 of the evaluation module 32, dependent on the first part and/or the second part of the data values of the assembled time series, and may be dependent on the selected class. Computing the result 300 dependent on the input data of the evaluation module 32 may be considered as one example for performing the evaluation of the behavior. The result 300 may include a scalar value in one example and may be considered as a score of the behavior of the driver during the traffic situation. In one embodiment, the result 300 may additionally include information about the selected class of traffic situation.

Alternatively or in addition, the result 300 may include a compressed data object which may represent a compressed form of the assembled time series. In one example, the processor 30 may include an auto-encoder module to generate the compressed data object. The compressed data object may include values of parameters of a first neural network of the second ML-module 36 trained by the auto-encoder module. During such a training, the data values of the assembled time series may be used both as input values and as output values of the first neural network.

Detecting the traffic situation explicitly may improve an accuracy of the result 300. The first sensor value 100, and in particular the data values of the above mentioned time series, may be designed for detecting the traffic situation and therefore may include important information related to the traffic situation. However, in one embodiment, the evaluation module 32 may calculate the result 300 without assigning the traffic situation to one of the classes explicitly. This may be realized by using the second ML-module 36. A detection system for detecting the traffic situation based on the input data of the evaluation module 32 may be provided by a subset of values of parameters of a second neural network of the second ML-module 36 in one example. The parameters of the first and second neural network may include information about a number of neurons and hidden layers and values of connection weights between the neurons of each network.

In one example, a first set of latent vectors may be specified by a first subset of the parameters of the second network. Each latent vector of the first set may represent one respective class of the set of classes representing the different traffic situations. The second network may be trained such that the latent vectors of the first set may be each activated differently dependent on the input data of the evaluation module 32. The selected class may be determined according to the latent vector of the first set, which is activated the most.

Alternatively or in addition, a second set of latent vectors may be defined by a second subset of the parameters of the second network for classifying the behavior of the driver during the traffic situation. Each latent vector of the second set may represent a respective class of behavior of the driver, such as turning the head, focusing the eyes forward, turning the eyes to the left or the right, falling asleep, driving too close to the further vehicle 2, and the like. The second network may be trained such that the latent vectors of the second set may be each activated differently dependent on the input data of the evaluation module 32. The behavior of the driver may be classified according to the latent vector of the second set which is activated the most. In one example, the evaluation module 32 may compute the result 300, dependent on the class, which the behavior of the driver is assigned to.

Figure 5:
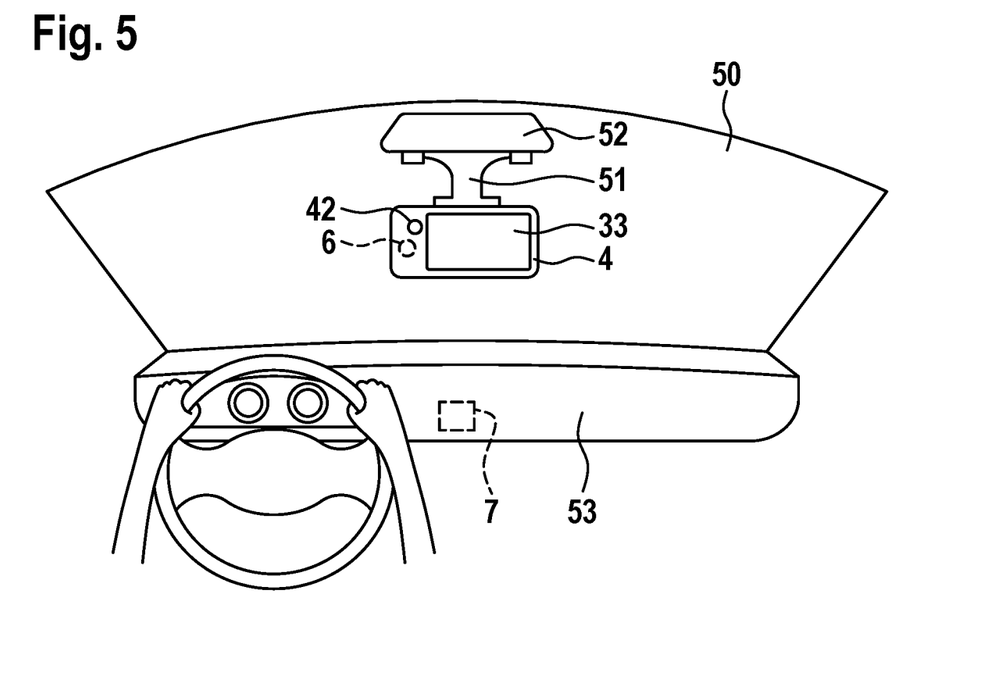
FIG. 5 schematically depicts the smartphone mounted at a windshield of the vehicle in FIG. 1 according to one or more embodiments shown and described herein.

In one embodiment, the second sensor 42, (i.e. the further camera) may be a rear camera and the first sensor 6, (i.e. the main camera) may be a front camera of the smartphone 4, wherein a lens of the front camera faces the windshield and a lens of the rear camera points away from the windshield in the direction of a driver seat of the vehicle 2 in the mounted state of the smartphone 4. This may allow to recognize one of the above mentioned behaviors of the driver dependent on the second data set 102, such as, by utilizing the second image file, which may include an image of the face of the driver, and a time series of the second image file, (i.e. the second time series). For that application, the smartphone 4 may be mounted at a windshield 50 or a driving mirror 52 of the vehicle 2 by a smartphone mount 51, as shown in FIG. 5. The sending unit 7 may be located behind a dashboard 53 of the vehicle 2.

The driver may install an application on the smartphone 4 such that the processor 30 may be configured for performing a data fusion of the data sets 101, 102, 103, 104, 105, 106 and the VCU data 120 as described above and for computing the result 300 as explained above. In addition, the smartphone 4 may be configured for entering and storing profile data for setting up a profile of the driver on the smartphone 4 in one example. The profile data may include anonymous profile data, such as an age, an amount of driven miles and a total time of driving experience of the driver, and/or personal data, such as data for identifying the driver, in one example. The processor 30 may be configured to process image files generated by the main camera and to output a feedback signal for adjusting a relative position of the smartphone 4 to the windshield 50 such that the main camera captures an area of a road in front of the vehicle 2.

Figure 6:
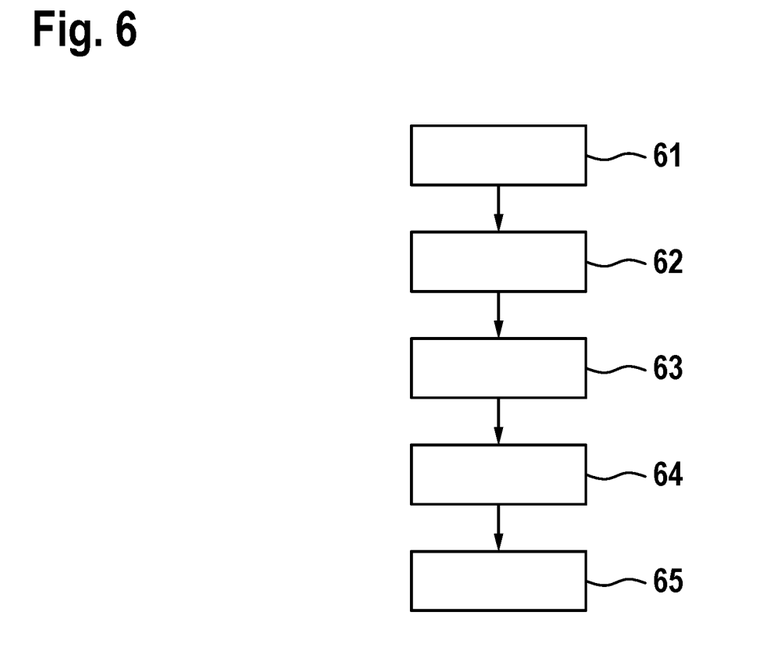
FIG. 6 depicts an illustrative flowchart of an example method for performing an evaluation of a behavior of a driver of the vehicle shown in FIG. 1 according to one or more embodiments shown and described herein.

FIG. 6 depicts an illustrative flowchart depicting steps of an example method for assisting a driver of the vehicle 2 by the system 1 according to one of the aforementioned embodiments. In a first step 61, the signal 200 may be provided by the VCU 3. In particular, the VCU 3 may update the internal and/or external data, including the signal 200, with the first further clock rate. This updated data may be transmitted by the sending unit 7, with the first further clock rate, and may be received by the receiving unit 8. In a second step 62, the smartphone 4 may be connected to the VCU 3 by the communication system 5. In one example, a Wi-Fi or a Bluetooth connection may be established between the sending unit 7 and the receiving unit 8. In a third step 63, the first sensor value 100 for detecting the traffic situation of the vehicle 2 may be generated by the first sensor 6. In particular, the data sets 101, 102, 103, 104, 105 and 106 may be generated by the sensors 6, 42, 43, 44, 45 and 46.

In a fourth step 64, the evaluation of the behavior may be performed by using the evaluation module 32 according to one of the aforementioned embodiments. In one example, the class of the traffic situations may be selected in order to detect the traffic situation during the fourth step 64. The evaluation of the behavior may be performed dependent on the first sensor value 100, and may be dependent on the data sets 101, 102, 103, 104, 105 and/or 106 and/or dependent on the VCU data 120 and/or the respective time series of these data sets and/or of the VCU data 120 as described above.

In a fifth step 65, the result 300 may be outputted by the smartphone 4 such that the result of the evaluation is perceivable for the driver. In one instance, the result 300 may be displayed on the display of the smartphone 4.

The numbering of the steps 61 to 65 may not prescribe an order according to which these steps may be performed. For example, the second step 62 may be carried out before the first step 61. In many applications, the first step 61 may be executed in parallel to the third step 63. In one embodiment, the first step 61 may be repeated in order to produce the above mentioned respective updated version of the VCU data 120 and the third step 63 may be repeated in order to produce the above mentioned respective updated version of the data sets 101, 102, 103, 104, 105 and 106.

In some instances, the performing of the evaluation of the behavior and the computing of the result 300 may be repeated during a driving session in which the driver drives the vehicle 2. In this case, the driving session may include several traffic situations during which the driver may behave differently. For each of these traffic situations a respective result may be generated analogously to the result 300 in order to obtain a set of results. In one example, the processor 30 may compute a summarized result 400 on the basis of the set of results, such as by the evaluation module 32.

In one example, the summarized result 400 may include several metrics for evaluating the behavior of the driver in general. In one example, the metrics may represent a general level of attention of the driver to the traffic, a level of readiness to take risks and/or an averaged level of reaction time of the driver. Alternatively or in addition, the metrics may include an averaged frequency of lane changes during the driving session, an averaged distance to a lead vehicle and/or an averaged value of speeding. The result 300 and/or the summarized result 400 may also include the profile data, and in particular weather conditions of the driving session.

Figure 7:
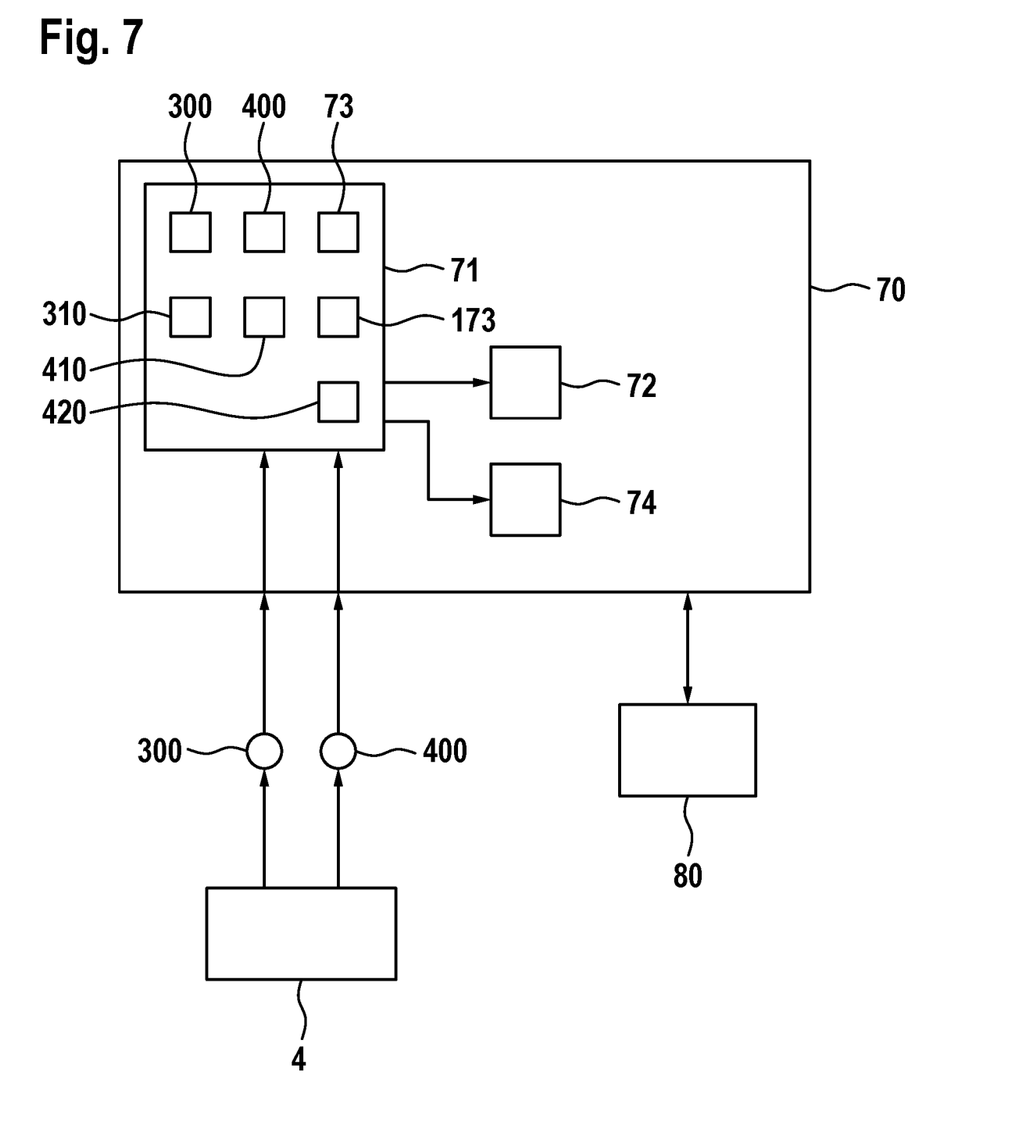
FIG. 7 illustrates a communication between the smartphone and an external server for transmitting a result of evaluation to the external server according to one or more embodiments shown and described herein.

In response to finishing the driving session, the result 300 and/or the summarized result 400 may be sent to a server 70, which may be considered as a part of the system 1. In most cases, the server 70 may be located externally from the vehicle 2.

The smartphone 4 may be communicatively coupled to and configured to establish a connection to the server 70, shown in FIG. 7, and to send the result 300 and/or the summarized result 400 to the server 70. By sending the result 300 and/or the summarized result 400 instead of the data values of the aforementioned time series, these data values may be kept private, or otherwise secure. The server 70 may store the result 300 and/or the summarized result 400 on a database 71 of the server 70, and in particular in relation to the profile data. In one example, the server 70 may be configured such that information about single events 73 referring to the driver, such as accidents, passenger reviews for a trip with the driver and car rental reviews, may be added to the driver's profile by the driver and/or authorized parties.

The database 71 may be a data storage device, such as a data repository, and may include or store further results 310 or further summarized results 410 of evaluations of a behavior of the driver and/or further drivers during further traffic situations and/or during further driving sessions. The further results 310 and/or further summarized results 410 may be generated analogously to the result 300 and the summarized result 400 respectively. In one example, the database 71 may include or store information about further single events 173 referring to the further drivers, such as accidents, passenger reviews for trips with each driver and car rental reviews.

Figure 8:
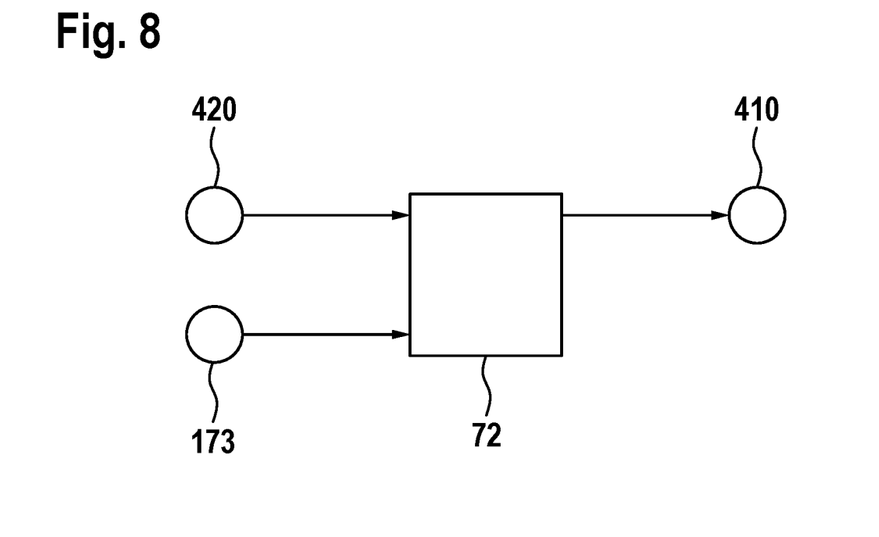
FIG. 8 displays a data flow for training a machine learning module according to one or more embodiments shown and described herein.

The server 70 may be configured to train a third ML-module 72 on the basis of the database 71 (e.g., based on stored data in the database 71). During a training of the third ML-module 72, the further results 310 and/or the further summarized results 410 may be used as target data of the third ML-module 72 and further anonymous profile data 420 referring to the further drivers and/or the information about further single events 173 may be used as input data of the third ML-module 72, as shown in FIG. 8.

The server 70 may be configured to generate a recommendation on how to drive the vehicle 2 dependent on the database 71, utilizing the trained third ML-module 72. In one example, a deviation between the result 300 or the summarized result 400 and a predicted result or a predicted summarized result respectively that may be computed using the anonymous profile data of the driver and/or the information about the single events 73 as input data of the trained third ML-module 72 may be determined. In case the deviation indicates that the driver merges faster into highways compared to the further drivers with a similar anonymous profile data, the recommendation may involve matching the ego speed of the vehicle 2 with the speed of the merging traffic for a safer merge into the highways.

In one embodiment, weather conditions and/or geographic data may be used as input data of the third ML-module 72 during the training of the ML-module 72. In this case, the recommendation may depend on an actual weather and/or an actual location of the vehicle 2. The server 70 may send the recommendation to the smartphone 4 to inform the driver. In response, the driver may alter or change driving characteristics or behavior by physically changing or altering the driving of the vehicle 2 based on the recommendations displayed or otherwise provided to the driver. A third party server 80 may have access to the server 70, including the database 71, and/or the third ML-module 72.

Figure 9:
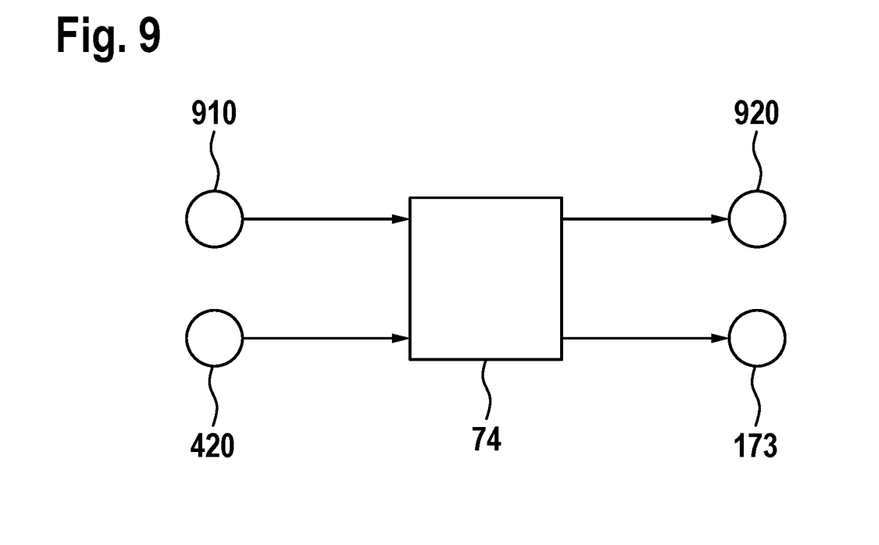
FIG. 9 displays a data flow for training a further machine learning module according to one or more embodiments shown and described herein.

Alternatively or in addition, the server 70 may be configured to train a fourth ML-module 74 on the basis of the database 71. During a training of the fourth ML-module 74, a first part 910 of the further results 310 and/or the further summarized results 410, such as the evaluated behavior of the driver, and/or the further anonymous profile data 420 referring to the further drivers may be used as input data of the fourth ML-module 74 and the information about further single events 173 and/or a second part 920 of the further results 310 and/or the further summarized results 410, such as a value indicating an averaged fuel consumption, may be used as target data of the fourth ML-module 74, as shown in FIG. 9. Using the fourth ML-module 74, the server 70 may be configured to generate recommendations for adapting the behavior of the driver, such as reducing the average velocity or frequency of lane change, in order to prevent receiving speeding tickets or in order to reduce the averaged fuel consumption given the result 300 or the summarized result 400 and/or the anonymous profile data as input data of the trained fourth ML-module 74. Therefore, the driver may physically alter or change driving characteristics or behavior by physically changing or altering the driving of the vehicle 2 based on the recommendations displayed or otherwise provided to the driver.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A driver-assistance system for assisting a driver of a vehicle, the driver-assistance system comprising:
    a vehicle control unit configured to provide a signal that describes at least partially a state of the vehicle;
    a mobile smartphone; and
    a communication system, wherein the mobile smartphone is communicatively coupled to the vehicle control unit via the communication system for receiving the signal and includes a first sensor, the first sensor is configured to generate a first sensor value for detecting a traffic situation of the vehicle,
    wherein the mobile smartphone is configured to:
        perform an evaluation of a behavior of the driver during the traffic situation dependent on the signal and the first sensor value;
        output a result of the evaluation of the behavior of the driver such that the result of the evaluation is perceivable for the driver; and
        provide a recommendation for the driver based on the result of the evaluation of the behavior of the driver,
    wherein in response to the recommendation, the driver physically changes a driving control to alter a driving of the vehicle.

2. The driver-assistance system according to claim 1, wherein the driver-assistance system further comprises:
    a database that stores results of evaluations of a behavior of the driver and further drivers during further traffic situations; and
    a server is configured to generate a recommendation on how to drive the vehicle dependent on the result of the evaluation of the behavior of the driver and the database,
    wherein the mobile smartphone is configured to establish a connection to the server and to send the result of the evaluation of the behavior of the driver to the server.

3. The driver-assistance system according to claim 1, wherein the mobile smartphone further comprises a machine learning module and is configured to perform the evaluation of the behavior of the driver by the machine learning module.

4. The driver-assistance system according to claim 1, wherein the mobile smartphone is configured to fuse the signal with the first sensor value.

5. The driver-assistance system according to claim 1, wherein the first sensor is configured as a lidar sensor to generate the first sensor value.

6. The driver-assistance system according to claim 1, wherein the first sensor is a camera configured to generate the first sensor value.

7. The driver-assistance system according to claim 1, wherein the communication system comprises:
    a sending unit configured for sending the signal via radio; and
    a receiving unit configured for receiving the signal via radio,
    wherein the sending unit is connected to the vehicle control unit via at least a first electrical line for transmitting the signal from the vehicle control unit to the sending unit and the mobile smartphone includes the receiving unit.

8. The driver-assistance system according to claim 1, wherein:

the mobile smartphone is mountable on a dashboard or a windshield of the vehicle in a mounted state, the mobile smartphone further comprises:
a front camera having a lens that faces the windshield; and
a rear camera having a lens that points away from the windshield in a direction of a driver seat of the vehicle in the mounted state of the mobile smartphone,
wherein the mobile smartphone is configured to perform the evaluation of the behavior of the driver dependent on a first image generated by the front camera and dependent on a second image generated by the rear camera, wherein data representing the first image or the second image includes the first sensor value.

9. A method for assisting a driver of a vehicle by a driver-assistance system comprising a vehicle control unit, a mobile smartphone and a communication system, the method comprising the following steps:
providing a signal by the vehicle control unit, wherein the signal describes at least partially a state of the vehicle;
connecting the mobile smartphone to the vehicle control unit by the communication system for receiving the signal;
generating a first sensor value for detecting a traffic situation of the vehicle by a first sensor of the mobile smartphone;
performing, by the mobile smartphone, an evaluation of a behavior of the driver during the traffic situation dependent on the signal and the first sensor value;
outputting, by the mobile smartphone, a result of the evaluation of the behavior of the driver during the traffic situation such that the result of the evaluation is perceivable for the driver;
providing, by the mobile smartphone, a recommendation for the driver based on the result of the evaluation of the behavior of the driver; and
in response to the recommendation, physically changing a driving control by the driver to alter a driving of the vehicle.

10. A computer program product embedded in a non-transitory computer readable medium comprising instructions, wherein an executing of the instructions by one or more processors initiates the one or more processors to execute:
providing a signal by a vehicle control unit, wherein the signal describes at least partially a state of a vehicle;
connecting a smartphone to the vehicle control unit by a communication system for receiving the signal;
generating a first sensor value for detecting a traffic situation of the vehicle by a first sensor of the smartphone;
performing, by the smartphone, an evaluation of a behavior of a driver during the traffic situation dependent on the signal and the first sensor value;
outputting, by the smartphone, a result of the evaluation of the behavior of the driver during the traffic situation such that the result of the evaluation is perceivable for the driver;
providing, by the smartphone, a recommendation for the driver based on the result of the evaluation of the behavior of the driver; and
in response to the recommendation, physically changing a driving control by the driver to alter a driving of the vehicle.

* * * * *